United States Patent Office 3,517,021
Patented June 23, 1970

---

3,517,021
4-AMINO-3-CYANOPYRIDINES AND METHODS OF PREPARATION
John F. Marschik, Summit, and Paul N. Rylander, Newark, N.J., assignors to Engelhard Minerals and Chemicals Corporation, Newark, N.J., a corporation of Delaware
No Drawing. Continuation-in-part of application Ser. No. 508,561, Nov. 18, 1965. This application May 20, 1968, Ser. No. 730,649
Int. Cl. C07d *31/46*
U.S. Cl. 260—294.9        7 Claims

ABSTRACT OF THE DISCLOSURE

A method for the preparation of 4-amino-3-cyanopyridines by the catalytic dehydrogenation of 4-imino-3-cyanopiperidines over a palladium dehydrogenation catalyst in the presence of a nitro compound as hydrogen acceptor and optionally in the presence of a minor amount of an aliphatic carboxylic acid.

---

This is a continuation-in-part of Ser. No. 508,561, filed Nov. 18, 1965, now abandoned.

This invention relates to new and useful chemical compounds and to a method for their preparation. More particularly, the present invention relates to new and useful 4-amino-3-cyanopyridines, and to a method for their preparation from 4-imino-3-cyanopiperdines by catalytic dehydrogenation in the presence of a hydrogen acceptor.

The products of this invention (I) have the general formula

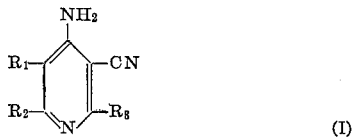

(I)

wherein $R_1$, $R_2$ and $R_3$ are selected from the group consisting of hydrogen and lower alkyl having from 1 to 10 carbon atoms, and are prepared from the corresponding imino-cyanopiperidines II having the formula

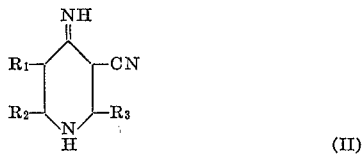

(II)

Imino cyanopiperidines are known to the art, and are prepared by the cyclization of di-($\beta$-cyanoalkyl)-amines, for example by the method of Backman et al., JACS 69, p. 1535 (1947). An improved method for the preparation of imino-cyanopiperidines by the cyclization of di-($\beta$-cyanoalkyl)-amines in the presence of a soluble alkali metal aromatic hydrocarbon reaction product, is disclosed and claimed in copending application Ser. No. 508,577, filed Nov. 18, 1965, now abandoned.

The novel compounds of this invention are prepared by catalytic dehydrogenation of 4-imino-3-cyanopiperidines in the presence of a hydrogen acceptor. The catalyst which is employed for the dehydrogenation is palladium which may be supported on inert support such as alumina, generally comprising from about 1 to about 10% Pd based on the weight of catalyst.

As hydrogen acceptor, we employ an aliphatic or aromatic nitro compound selected from the group consisting of mono- and dinitro benzene, mono- and dinitro alkyl benzenes having from 1–4 carbon atoms in the alkyl group and mono-nitroalkanes having from 1 to 8 carbon atoms in the molecule. Typical nitro compounds which can be utilized include, for example, nitrobenzene; dinitrobenzene; o-, m-, and p-nitrotoluene; o-nitroisobutylbenzene; o- and p-nitrocumene, nitromethane, 1-nitropropane; 1-nitrohexane; 3-nitro-2,2-dimethylbutane; 1-nitro-2,5-dimethylhexane and the like. Of these, nitrobenzene and nitrotoluene are preferred.

The dehydrogenation of the 4-imino-3-cyanopiperidine is effected in accordance with our process by dissolving the piperidine in the hydrogen acceptor, and heating the resultant solution in the presence of the dehydrogenation catalyst, preferably in an inert atmosphere, at a temperature between about 100 and 200° C. for a period of time sufficient to effect substantial dehydrogenation of the piperidine compound. Atmospheric, super-atmospheric, or sub-atmospheric pressure may be employed. Preferably, the catalyst is employed in an amount between about 1% and 10% by weight, based on the weight of piperidine compound employed. The reaction may be effected in the presence of the nitro compound as the sole solvent, or other suitable solvents, e.g. benzene, toluene; iso-octane may be added. Sufficient nitro compound is employed, however, to provide at least two mols of hydrogen acceptor per mole of imino-piperidine being dehydrogenated.

In a particular embodiment of our invention, we have found that a minor amount of a lower fatty acid, e.g. acetic acid, exerts a substantial effect on the dehydrogenation reaction, when employed in an amount between 0.05% and about 4% by weight based on imino-piperidine; substantial improvement in yield can be achieved in the conversion of crude imino-piperidine to the desired dehydrogenation product. Utilization of over about 4% acetic acid results in complete suppression of the dehydrogenation reaction. While acetic acid is preferred as a promoter, other lower carboxylic acids, e.g. containing from 2–10 carbon atoms, such as butyric acid, isobutyric acid, iso-octoic acid, caproic acid and the like can be employed.

The 4-amino-3-cyanopyridines which are produced by the process of the present invention are members of the class of aminopyridine compounds, which are important intermediates in the synthesis of dyes and medicinals, and serve as useful starting materials for further synthesis. 4-amino-3-cyanopyridine can be converted to 4-aminonicotinic acid by hydrolysis of the cyanide group and, upon heating, is decarboxylated to 4-amino-pyridine.

The following examples are illustrative only and are not to be construed as limiting.

PREPARATION OF 4-IMINO-3-CYANOPIPERIDINE

A solution of sodium naphthalenide was prepared by dissolving 5 g. sodium in a mixture of 60 g. naphthalene in 500 ml. dimethoxyethane at 10° C. To this solution was added 240 g. di-($\beta$-cyanoethyl)-amine and the reaction mixture maintained with stirring at 50° C. for 20 hours. During the stirring, a white precipitate formed which was finally filtered off at room temperature and recrystallized from methanol. There was recovered 174 g. white crystals corresponding to 72.6% theory of 4-imino-3-cyanopiperidine, melting 197–199° C., and having a nitrogen content (Kjeldahl) of 33.8% (calc. 34.1%).

EXAMPLE 1

A solution of 15 g. 4-imino-3-cyanopiperidine dissolved in 300 ml. of nitrobenzene and 5 g. of 5% palladium on alumina catalyst was refluxed for 2½ hours at 150° C. and a pressure of 100 mm. Hg in nitrogen atmosphere. The catalyst was filtered from the hot solution, which was then cooled to 10° C. and filtered. The filter cake weighed 9.8 gm. and had a melting point of 168–170° C. The mother liquor was concentrated to 30 ml., filtered at 10° C. to give 3.6 g. of solid which was combined with the original filter cake. After recrystallization from water, 11 g. corresponding to 76% theory of 4-amino-3-cyanopyridine was obtained, melting point 169.5–170° C. Elemental analysis of the recrystallized product showed 60.0% C, 4.18% H, 35.26% N (theory for $C_6H_5N_3$: 60.5% C, 4.2% H, 35.3% N).

EXAMPLE 2

A solution of 15 g. 4-imino-3-cyanopiperidine prepared as above in 300 ml. 1-nitropropane was refluxed for 3 hours in the presence of 5 g. of 5% palladium on alumina catalyst. The solution was filtered hot to separate the catalyst, and nitropropane distilled from the mother liquor to dryness. The residue so obtained was recrystallized from 200 ml. water containing 2 gm. activated charcoal. A yield of 5.1 g. of 4-amino-3-cyanopyridine was obtained.

EXAMPLE 3

A solution of 15 g. 4-imino-3-cyanopiperidine prepared as above in 300 ml. o-nitrotoluene was refluxed for 2 hours in the presence of 5 gm. of 5% palladium on alumina catalyst 160° C. and a pressure of 150 mm. Hg in nitrogen atmosphere. The catalyst was filtered from the hot solution which was then cooled to 10° C. and filtered. The filter cake weighed 10.2 g. and had a melting point of 168–169° C. After recrystallization from water, 9.9 gm. correspodning to 68% theory of 4-amino-3-cyanopyridine was obtained, melting point 170–171° C.

EXAMPLE 4

Crude 4-imino-3-cyanopiperidine prepared as described hereinabove, but without recrystallization, was dehydrogenated by the method of this invention in the presence of varying amounts of acetic acid. In each run, 15 gm. of the crude piperidine, previously washed with isopropyl alcohol, was dissolved in 300 ml. nitrobenzene containing 5 gm. of 5% Pd on alumina in powder form and varying amounts of acetic acid. The reaction mixture was heated to 170° C. and the pressure adjusted to about 160 mm. Hg, and maintained under these conditions with stirring for one hour while water formed during the reaction was separated by nitrogen sweep. The reaction mixture was then filtered at 100° C., and the product separated by crystallization and filtration at 10° C. The product 4-amino-3-cyanopyridine was recrystallized in each case from water saturated with 4-amino-3-cyanopyridine in order to accurately determine yields. The results of these experiments are given in the following table: in which the percent acetic acid is based on weight of piperidine treated, and percent yield is the percent of theory.

| Percent acetic acid: | Percent yield |
|---|---|
| None | 51 |
| 0.05 | 56.6 |
| 0.07 | 56.6 |
| 0.13 | 59.4 |
| 0.2 | 66.2 |
| 0.33 | 73.7 |
| 0.5 | 74.5 |
| 0.66 | 76.0 |
| 1.32 | 80.7 |
| 2.0 | 77.2 |
| 3.3 | 71.8 |
| 6.6 | 0 |

It will be seen that addition of minor effective amounts of acetic acid up to about 4% based on the imino piperidine treated resulted in improved yield of 4-amino-3-cyanopyridine but that the dehydrogenation reaction was completely suppressed at higher acetic acid concentrations.

What is claimed is:

1. A method for the preparation of a 4-amino-3-cyanopyridine compound having the formula

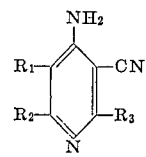

wherein $R_1$, $R_2$ and $R_3$ are selected from the group consisting of hydrogen and lower alkyl groups having from 1 to 10 carbon atoms comprising contacting a 4-imino-3-cyanopiperidine compound having the formula

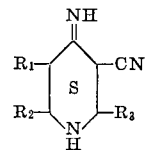

with from about 1 to 10% by weight, based on the weight of piperidine compound, of a dehydrogenation catalyst consisting essentially of about 1 to 10 percent palladium on an inert support in a solution containing a hydrogen acceptor selected from the group consisting of mono- and dinitrobenzene, mono- and dinitroalkyl benzenes having from 1–4 carbon atoms in the alkyl group and mononitroalkanes having from 1 to 8 carbon atoms in the molecule at a temperature between about 100 and 200° C., and recovering the 4-amino-3-cyanopyridine compound from said solution.

2. The process of claim 1 wherein said dehydrogenation catalyst is palladium supported on alumina.

3. The process of claim 1 wherein said hydrogen acceptor is nitrobenzene.

4. The process of claim 1 wherein said hydrogen acceptor is 1-nitropropane.

5. The process of claim 1 wherein said hydrogen acceptor is ortho nitrotoluene.

6. The process of claim 1 wherein said solution contains from about 0.05 to about 4% by weight, based on the weight of 4-imino-3-cyanopiperidine, of a lower aliphatic carboxylic acid having from 1 to 10 carbon atoms in the molecule.

7. The process of claim 6 wherein said lower aliphatic carboxylic acid is acetic acid.

References Cited

Littell et al.: Journal of Medicinal Chemistry, vol. 8, p. 722 (1965).

JOHN D. RANDOLPH, Primary Examiner

A. L. ROTMAN, Assistant Examiner

U.S. Cl. X.R.

260—293